United States Patent Office 3,208,959
Patented Sept. 28, 1965

3,208,959
CELLULAR POLYURETHANE STABILIZED WITH A HALOGEN CONTAINING ORGANIC PHOSPHITE AND METHOD OF MAKING SAME
George T. Gmitter, Akron, Ohio, assignor to The General Tire & Rubber Company, Akron, Ohio, a corporation of Ohio
No Drawing. Filed Jan. 28, 1964, Ser. No. 340,809
18 Claims. (Cl. 260—2.5)

This invention relates to stabilized polyurethanes and to methods for making the same. More particularly, it relates to stabilized polyether-urethane foams, especially flexible, polyether-urethanes, and to methods for making the same.

This application is a continuation-in-part of prior copending patent application of George T. Gmitter, Serial No. 810,992, filed May 5, 1959, now abandoned.

The disclosures of copending application of Gilbert H. Swart, George T. Gmitter and Louis Nicholas entitled "Improving the Stability of Polyether Glycol Urethane Products," Serial No. 660,067, and filed May 20, 1957 now U.S. Patent No. 2,915,496; of copending application of George T. Gmitter entitled "Process for Producing Cellular Polyether-Urethane Elastomers Using Silicone Oils," Serial No. 707,351, and filed January 6, 1958, now abandoned; and of copending application of George T. Gmitter and Edwin M. Maxey entitled "Polyurethane Foam and One-Step Method of Making Same," Serial No. 790,323, and filed February 2, 1959, are included herewith by reference for all common subject matter.

It has been observed that in the preparation of polyether-urethane foams in large masses, the centers of the materials become tacky and discolored during the curing process and after heat aging. This has become particularly noticeable in the manufacture of the flexible polyether-urethane foams by a "One-Shot" process where organic metallic compounds such as some organic tetravalent tin compounds are employed as catalysts and where silicones are also used. It is not known precisely what causes the degradation of these foams although it may be due to the fact that the heat necessary to cause reaction plus the exothermic heat of reaction results in reversion of the material, apparently due to the catalyst, or the decomposition products of the catalyst alone or with oxygen. Since the cellular masses act as insulators, much of the heat is trapped for a considerable period of time which may facilitate this degradation or reversion. Even if the foams are otherwise satisfactory initially, they may seriously degrade when heated for extended periods of time. Thus, it would be highly desirable to provide a process or method whereby the degradation on curing and aging of polyurethanes, especially foams, can be avoided so that products are obtained which are not tacky nor discolored after curing and heat aging.

It, therefore, is an object of the present invention to provide a method for making a polyurethane such as a foam exhibiting improved resistance to heat degradation.

It is another object of this invention to provide a method for making a flexible polyether-urethane cellular or foam product, particularly by the "One-Shot" process, which exhibits improved heat aging and freedom from tackiness and discoloration.

Still another object is to provide a polyurethane such as a foam having a high resistance to heat degradation.

A further object is to provide a flexible polyether-urethane foam, cellular composition and/or product in which the center of the foam is non-tacky and free of discoloration after curing and which exhibits no degradation after extended heat aging.

These and other objects and advantages of the present invention will become more apparent to those skilled in the art from the following detailed description and examples.

According to the present invention, it has been discovered that the use or addition of a minor amount of a fluorine and/or chlorine containing organic phosphite during the process of forming the polyurethane such as a foam using an organo metallic such as an organic tetravalent tin or tin salt catalyst will serve to protect the polyurethane against heat degradation and the like. The resulting products do not exhibit discoloration nor tackiness after curing and after extended heat aging. Also, the center of the present foams after formation are not tacky nor discolored. Even after extended heat aging, for example, dry heat aging, the foams are not tacky and not discolored. The use of said phosphite is particularly effective in those cases in which flexible cellular polyether urethanes are to be produced and in which metallo organic catalysts such as organic tetravalent tin compounds or salts and, also, silicones are employed. Polyester urethanes are much more stable than the polyether urethanes and do not in general need antioxidants or other materials to protect them against deterioration by dry heat, but these phosphites can be used with them. Although these organic phosphites containing fluorine and/or chlorine atom(s) bound to the organic portions of the phosphites are particularly useful in protecting flexible polyether-urethane foams against heat decomposition, the present invention in its broad aspects contemplates the use of these phosphites in other organo metallic or tetravalent tin compound catalyzed polyurethane systems, such as the flexible, rubbery, rigid and semi rigid, thermosetting and thermoplastic, polyester and polyether-urethane and mixed polyether-polyester urethane, solid or porous products to protect them against heat degradation and the like.

The organic phosphites used in the present invention have the following general formula:

where R is selected from alkyl, aryl, cycloaliphatic, alkaryl and aralkyl groups, at least one of said R groups containing at least one fluorine or chlorine atom attached to a carbon atom. The total maximum number of said halogen atoms or mixtures thereof present in said phosphite should be equal to the maximum possible number of carbon-hydrogen linkages in said groups. It is preferred that all of the R radicals be aryl or alkaryl radicals of from 6 to 14 carbon atoms containing 1 or 2 chlorine atoms attached to one or two carbon atoms. Specific examples of compounds which are useful in the practice of the present invention are: tri (difluoro chloromethyl) phosphite; tri (2-chloroethyl) phosphite; tri (chloropropyl) phosphite; tri (fluorobutyl) phosphite; tri (chlorobutyl phenyl) phosphite; tri (fluorophenyl ethyl) phosphite; monofluorophenyl, di (chlorophenyl) phosphite; tri (dichlorocyclohexyl) phosphite; monochloropropyl-, di. (chloroheptyl) phosphite; monochlorophenyl-, di (chlorotolyl) phosphite; tri (chlorocyclopentyl) phosphite; tri (chlorohexyl) phosphite; tri (dichlorohexyl) phosphite; tri (fluoroheptyl) phosphite; tri (difluorooctyl) phosphite; tri (chlorooctyl phenyl) phosphite; tri (chlorodecyl) phosphite; tri (α-chloro-α,α-difluoro tolyl) phosphite; tri (1-chloro-naphthyl-5) phosphite; tri (2-chloro-anthracyl-5) phosphite; tri (naphthyl-1 (chloromethyl)-5) phosphite; (monochloropropyl phenyl)-, di (fluorobutyl tolyl) phosphite; tri (dichlorodecyl) phosphite; tri (dichlorodecyl phenyl) phosphite; tri (trichlorooctyltolyl) phosphite; tri (chlorophenyl-nonyl) phosphite; tri (2-chloro-pyridyl-4) phosphite; tri (2-chloro-furyl-4) phosphite; tri (tetrafluorobutyl) phosphite; tri (2,2'-dichloropropyl) phosphite; tri (pentachloro phenyl) phosphite; tri (monochloro phenyl) phosphite; (monochlorophenyl), dibutyl phosphite; di (monochlorobutyl), phenyl phosphite; and other fluorinated and/or chlorinated organic phosphites and mixtures thereof.

These halogenated organic phosphites are well known materials and may be prepared by a number of methods. For example, one method of preparing them is to react a chloro alkanol, such as 3-chloro propanol-1 with phosphorous trichloride. The reaction product contains alkyl chloride and the trichloro alkyl phosphite which can be readily separated from the alkyl chloride. Another method is to react a phenol with phosphorous trichloride to obtain phenylchloride and tri (chloro phenyl) phosphite which can be separated from the phenyl chloride.

The halogenated organic phosphite is used in a minor amount by weight based on the weight of the polyurethane in the foam and sufficient to prevent heat degradation or deterioration of the polyurethane foam. In general, the amounts employed will range from about 0.05% to 7.5% by weight based on the total weight of the urethane forming reactants, although it is preferred to use from about 0.25 to 3.0% by weight based on the total weight of the polyurethane forming reactants. The halogenated organic phosphite may be added either to the polyester, polyether or to an isocyanate modified polyester or polyether (a prepolymer). It, also, may be added to the isocyanate provided none of the other reactants are present or to the catalyst or other ingredients prior to the reaction forming the polyurethane. However, it can be added to all the ingredients at one time. This is especially desirable in the "One-Shot" process in which all of the polyurethane forming materials are mixed together at one time.

Organo metallic compounds such as organic tetravalent tin or stannic tin catalysts are very active materials for forming the necessary crosslinking and chain extension occurring in the polyurethane (or gelling) during reaction of the polyurethane forming ingredients. However, they cause deterioration especially when the polyurethane is to be made into a product of relatively thick cross section. In foams it is necessary to get the required gelation along with the required blowing if a satisfactory foam is to be obtained. If there is insufficient gelation, the foam will collapse. If there is insufficient cell formation, the desired density, etc. will not be obtained. Even in waterless systems for making rigid urethane foams such as those having closed cells where alkanes or Freons are used for blowing, it is still necessary to get the required amount of gelation during foam formation. In the water systems in which tertiary amines are also used to accelerate the $H_2O$-isocyanate reaction to get open celled or substantially open celled foams, it is very necessary to adjust the rates of foaming and gelling to get a low density, satisfactory product. Blowing and gelation reactions have to be in equilibrium in any foam system to get stable foams having proper cell structure. In the prepolymer system, much of the polyurethane reaction has taken place so that a potent catalyst is not usually required to furnish foaming, for example a tertiary amine may be only necessary. However, in the "one-shot" system where low viscosity materials are used having a low OH functionality, a potent catalyst is needed to build up the gelation reaction and the organic tetravalent tin compounds are the most effective to achieve this result. Unfortunately, tetravalent tin compounds among other things cause browning; however, where they are used, the halogenated organic phosphites are necessary to overcome the undesirable effects of the tin compounds yet obtaining fast gelation, especially where flexible foams are to be produced. Tetravalent tin compounds thus are very desirable to use as catalysts to effect these results even though they have some adverse effects. These tetravalent tin compounds have at least one direct carbon to tin bond and include the teravalent tin hydrocarbons, hydrocarbon tin oxides, hydrocarbon tin halides, hydrocarbon tin sulfoxides, hydrocarbon tin salts of organic acids (tin salt catalyst), hydrocarbon tin hydroxides, hydrocarbon tin sulfides and hydrocarbon tin alkoxides and the like in which the hydrocarbon group is an alkyl, aryl, aralkyl, alkaryl or cycloaliphatic radical of from 1 to 20 carbon atoms. The alkoxide and carboxylic acid salt residue can have from 1 to 20 carbon atoms. The organic tin salt catalysts are particularly desirable in making foams. Specific examples of some of these compounds are tetra butyl tin, tetra phenyl tin, di butyl diphenyl tin, trihexyl tin chloride, tripropyl tin hydroxide, dihexyl tin oxide, butyl tin trichloride, triethyl tin sulfoxide, dibutyl tin sulfide, diethyl tin dibutoxide, dibutyl tin diacetate, dibutyl tin dilaurate, dibutyl tin di-2-ethyl hexoate, and other organic derivatives of tin and the like and mixtures thereof. These catalysts are used in an amount of from about 0.01 to 4% by weight based on the weight of the polyurethane forming materials or the polyurethane condensation product.

The products of the present invention may be solid, porous, flexible, rigid or semi rigid polyurethanes. The degree of flexibility, rigidity and/or porosity depends on the degree of linearity or branching of the polyester, polyether, or polyisocyanate and whether or not blowing agents are employed. In general, branch chain ether and/or ester polymers or a major amount of said polymers are employed to make foam products.

The essentially or substantially linear hydroxyl terminated polyesters have an average molecular weight of from about 600 to 3000 or more and an acid number less than 10 and preferably less than 3. The polyester is normally prepared by the esterification of at least one aliphatic dibasic acid or an anhydride thereof with at least one glycol. Ratios of more than one mole of glycol to acid are useful so as to obtain chains containing a preponderance of terminal hydroxyl groups. The acids used in making the linear polyesters are generally aliphatic dicarboxylic acids having the formula

HOOC—R—COOH where R is an alkylene radical having from 2 to 8 carbon atoms. Preferably, these acids have the formula $HOOC(CH_2)_xCOOH$ where $x$ is a number from 3 to 8. The anhydrides of the acids can also be used. Mixtures of acids and their anhydrides may also be employed. Specific examples of dicarboxylic acids are adipic, succinic, pimelic, suberic, azelaic and sebacic acids. The glycols used in making the linear esters generally contain from 4 to 10 carbon atoms. Preferably, in making linear polyesters the glycols have the formula

$HO(CH_2)_yOH$ where $y$ is a number from 4 to 8. Mixtures of the glycols can be employed and examples of useful glycols are butanediol-1,4, hexamethylenediol-1,6 octamethylene diol-1,8 and the like. The polyesters can also be made by transesterification and other processes. Mixtures of polyesters can be employed.

Where branch chain polyesters are desired, they may be obtained by the reaction of minor molar amounts of polyols such as glycerols, hexanetriol, pentaerythritol and the like with dicarboxylic and other polycarboxylic acids, preferably also with diols.

The polyester can also be made with minor amounts of diamines or amino alcohols to provide the polyester with a small number of amide linkages. However, the diamines or amino alcohols should be used in the amount of 25 mole percent or less so that the polyester contains a preponderance of ester linkages and a minor amount of amide linkages and is considered to be a polyester.

The glycerides of ricinoleic acid, castor oil, alkyd resins etc. may also be utilized.

The polyethers employed in the practice of the present invention may be obtained from alkylene oxides, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula

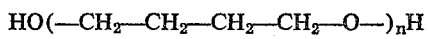

where $n$ is an integer. Glycols may also be polymerized in the presence of mineral acids, sulfonic acid or fuller's earth. Still other methods well known to those skilled in the art may be utilized in the preparation of these polyalkyleneether glycols. The linear polyalkylene ether glycols have at least three carbon atoms in their alkylene groups and can have as high as 8 or more carbon atoms in the alkylene groups. Useful examples of polyether glycols are polypropylene ether glycol, polyethylenepropylene ether glycol, polytetra methylene ether glycol, polypentamethylene ether glycol, polyhexamethylene ether glycol, poly 1,6-octamethylene ether glycol and the like and mixtures thereof.

Branch chain polyether polyols may be obtained by reacting glycols or alkylene oxides or mixtures thereof and the like with materials such as sucrose, sorbitol, styrene-vinyl alcohol copolymers, hexane triol, pentaerythritol, glycerol, phloroglucinol, trimethylol phenol, trimethylol benzene, trimethylol propane and the like. In making foams which are rigid, it is generally preferred to employ the low molecular weight branch chain polyether or polyester polyols, whereas in making the flexible materials it is preferred to employ the high molecular weight branch chain polyols.

The average molecular weight of the polyols may vary from about 175 to 5000 or more. When making flexible polyetherurethane foams, it is preferred to employ branch chain polyethers having an average molecular weight of from about 2000 to 4000 and at least 3 reactive hydroxyl groups.

In some polyurethane formulations it is not necessary to use crosslinking materials. However, when employed, they may contain from 2 up to 8 or more reactive hydroxyl radicals. Their molecular weight can be low or it can be as high as the polyesters or polyethers disclosed hereinabove which can be employed and which are highly branched such as a reaction product of glycerol and propylene oxide or hexane triol and propylene oxide and the other polyester and polyether polyols mentioned above. Still other materials which can be used as crosslinkers are pentaerythritol, glycol, glycerol, trimethylol propane, phenyl trimethylol methane, 1,2,4-butanetriol, 1,1,1-trimethylol hexane, pentaerythritol monoleate, 1,4-butanediol, 1,2,6-hexane triol, N,N,N',N'-tetrakis (2-hydroxypropyl) ethylene diamine, "Hyprose SP-80" (the reaction product of a sucrose with 8 equivalents of propylene oxide to give a compound having 36 carbon atoms and eight reactive hydroxyl groups) and the like. Mixtures of these materials may be used.

The polyesters and polyethers should contain at least 3 carbon atoms between ester or ether linkages to avoid water sensitivity. However, some ethylene linkages can be used provided a substantial amount of the other linkages contains 3 or more carbon atoms. While unsaturated polyesters or polyethers may be employed, it is much preferred to use materials which are saturated or essentially saturated. The polyesters and polyethers should also be substantially or essentially hydroxyl terminated. It, also, is preferred that the OH groups be primary or secondary and it is even more preferred that the OH groups of the polyesters, polyethers and cross linkers be primary OH groups to improve the heat stability.

Mixtures of polyesters and polyethers may be used in the practice of the present invention. If the polyesters or polyethers are impure or contain traces of catalysts etc. which would tend to speed their reaction with polyisocyanates where fast reactions are not wanted, they may be washed or otherwise treated to reduce this activity. The isocyanates may be recrystallized or distilled to purify them.

The polyisocyanate used in the practice of the present invention may be any polyisocyanate having 2, 3, or more functional or reactive isocyanato groups. They may be aromatic, aliphatic or aliphatic-aromatic compounds. Examples of useful polyisocyanates which may be employed are hexamethylene diisocyanate, naphthalene-1,5-diisocyanate, napthalene triisocyanate, dichloro diphenyl methane diisocyanate, metaphenylene diisocyanate, paraphenylene diisocyanate, tolylene diisocyanate, p,p'-diisocyanto diphenylmethane, dimethyl diphenylmethane diisocyanate, bitolylene diisocyanate, bibenzyl diisocyanate, durene diisocyanate, 2,3,5,6-tetramethyl-paraphenylene diisocyanate, diphenyl dimethyl methane diisocyanate, diphenylene ether diisocyanate, and polyaryl polyisocyanates such as "Papi" having the general formula:

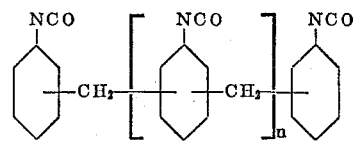

where $n$ has an average value of 1. Still other polyisocyanates can be employed. Mixtures of the polyisocyanates can be used, for example, an 80–20 or 65–35 mixture of 2,4- and 2,6-tolylene diisocyanates or other isocyanate mixtures. A preferred class of diisocyanates including the tolylene diisocyanates has the general formula:

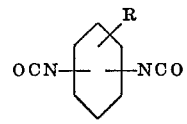

where R is selected from the group consisting of hydrogen, methyl, ethyl, propyl, isopropyl, butyl, amyl, hexyl, and the other lower molecular weight alkyl radicals.

The amounts of polyesters, polyethers, crosslinker (if used) and polyisocyanate, employed depend on the degree of chain extension and crosslinking desired, as well as on the type of polyol or polyisocyanate used and the ultimate type or product desired and its properties. In general, in the practice of the present invention there can be employed from about 0.5 to 12 equivalents of isocyanate per equivalent of polyester or polyether hydroxyl and from about 0.05 to 5 equivalents of polyol crosslinker hydroxyl per equivalent of polyester and/or polyether hydroxyl. The product of the present invention may contain residual hydroxyl or isocyanato groups or the reactants may be so balanced that the final product contains essentially no unreacted isocyanato and/or hydroxyl groups. In some instances a product containing residual isocyanato groups is obtained to take advantage of post curing when desired.

Tertiary amine catalysts are desirably employed in the practice of the present invention when $H_2O$ is used partially or entirely as the blowing agent. Examples of such amines are triethyl amine, 4-n amyl pyridine, trihexyl amine, N-methyl morpholine, triethylene diamine (Dabco), 4-pyridine propanol, 2-ethanol pyridine, di(ethylene amino ethanol) adipate, dibutyl amino ethanol, N,N'-diethyl-2-methyl piperazine, and the like. Still other catalyst materials may be used, such as organic cobalt, lead and nickel naphthenates, stearates and linoleates as well as organic stannous tin catalysts. The catalysts are generally used in an amount from about 0.01 to 4% based on the weight of the condensation product, although other amounts may be employed. It generally is preferred to employ just the amount needed to obtain the desired rate of reaction to avoid waste of the catalyst and to reduce the possibility of deterioration of the product.

It will be noted that the use of tin salt catalysts, tetravalent tin salts having from 1 to 3 hydrocarbon groups (alkyl, etc.) of from 1 to 9 carbon atoms and from 1 to 3

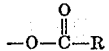

groups in which R is an aralkyl or an alkyl radical of 1 to 19 carbon atoms,

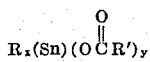

where $x=1$ to 3, $y=3$ to 1, R is an alkyl radical of 1 to 19 carbon atoms and R' is an alkyl radical of 1 to 19 carbon atoms, is particularly effective in one-step blowing of flexible polyether-urethane foams since it avoids the necessity of making a prepolymer, but these tin salts when used with flexible materials seem to accelerate the heat aging of the foam especially as the concentration of these catalysts is increased. However, when the halogenated organic phosphites of this invention are employed in a one-step foaming process in the presence of such tin catalyst, the aging problem is essentially overcome. Mixtures of the above catalysts may be used.

Other additives may be added to the reaction mixture of the present invention, such as the silicones including the siloxane-oxyalkylene block copolymers as shown in the above copending applications and other silicones or silanes such as vinyl triethoxy silane, butyl triethoxy silane, amyl triethoxy silane and other monomeric and polymeric organic silanes and silicones, and the like. Only very small amounts of silicones should be used with the polyester type foams while much larger amounts can be used with the polyether type. Emulsifiers, if used, are preferably anionic or nonionic and also preferably are nonacidic or substantially nonacidic. Wetting agents, carbon black, TiO$_2$, SiO$_2$ containing materials, wood flour, metal flakes, organic and inorganic synthetic and natural fibers (wool, cellulose fibers, nylon fibers, glass fibers (surface treated or not) etc.), color pigments and dyes, other antioxidants, antiozonants or antidegradents, deodorants, fungicides, plasticizers, rubbers, resins etc. may be used in the reaction mixture as desired. If a foam is to be made using water, the water can be added in the form of a natural or synthetic rubber and/or resin latex.

A small amount of water as a blowing agent is added to the reaction mixture to make flexible and semiflexible foams. It can be mixed with the other reactants at the same time in a one-step foaming process. The water may first be added to the polyether or polyester but can be introduced to the foaming nozzle at the same time as the other ingredients. If a prepolymer is to be made, it is desirable that the reactants be substantially anhydrous to avoid the formation of urea groups so that in this case the water should be added at about the time of foaming. Lithium aluminum hydride can be used with water as a blowing agent. In place of water or water activated materials, other blowing agents can be used such as the liquid fluoro- or chlorofluoroalkanes (the "Freons"), liquefied hydrocarbon gases, such as methane, ethane and the like as shown in prior copending application of Charles B. Frost, Serial No. 541,823, filed October 20, 1955, entitled "Polyurethane Foams and Method of Making Same," now abandoned. Mixtures of the liquefied gases can be used. Mixtures of water and the "Freons" may likewise be used. The liquid organic materials may be used in an amount of from about 2 to 40%, preferably from 9 to 30%, by weight based on the total weight of the polyurethane forming materials.

In making the products of the present invention the polyisocyanate may be reacted with the polyether or poly- ester and then with a crosslinker as desired to form a finished product. However, the polyisocyanate may first be reacted with the crosslinker and then with the polyester or polyether. Also, it is not necessary always to use the crosslinker but by proper selection of the polyether or polyester employed it will be only necessary to react the polyisocyanate with the polyester or polyether to obtain the desired products. The use of the halogenated phosphites is particularly effective in a "one-shot" process of making flexible polyether-urethane foams. In such a process all of the ingredients are pumped (and heated as necessary) to the nozzle of a foaming machine where they are intimately mixed together and then dumped into pans or forms wherein the reaction mixture is allowed to foam and cure. Heat is applied as necessary to insure the proper reaction, chain extension, crosslinking, cell formulation and vaporization or decomposition of the blowing agent. After curing, the foam can be either heated or aged as desired to improve its properties. Such aging may be conducted in a moist atmosphere if desired. Furthermore, flexible foams can be squeezed or wrung after curing to break the cell walls to increase their moisture vapor transmission and their resilience in some instances. If heated, during the squeezing operation, some of the catalyst or catalyst products may be evolved if vaporizable and not trapped within the polyurethane itself.

The products of the present invention are useful in making rubbery, resilient, flexible, semi-rigid, rigid, cellular (open or closed cell) or non-cellular, gum and other polyurethanes and the like. They, also, may be thermoplastic or thermosetting and can be made into liquid form for casting purposes or as adhesives. Porous films or coatings, molded goods and extrusions can be made from the materials of the present invention. some specific examples of useful articles which can be made from the products of the present invention are shoe heels and soles, belts, pallet rollers, tires, bumpers, coated fabrics, tarpaulin coatings, potting compounds, insulated boots, pillows, mattresses, door panels, and carpet underlays; insulation for food containers, refrigerators, and inaccessible pipe clusters; buoyant elements for boats, buoys, life rafts and life preservers; in sandwich construction for panels, walls of buildings, vehicles, and the like; lightweight reinforcing material for aircraft etc.

It is not precisely known how the halogenated organic phosphites prevent or retard heat aging polyurethane foams during and after curing. It will be appreciated that foams have relatively high exotherms. That is, the exothermic heat of reaction is relatively high, and since the foam acts as an insulator, this heat plus any heat applied to initiate foaming and curing does not readily escape, yet in such situations the halogenated organic phosphite prevents heat degradation. In the presence of the organo metallic catalyst, i.e., the tetravalent tin catalysts, under these heating conditions and without the phosphite, reversion or decomposition of the foam apparently occurs due to and may be accelerated by these catalysts or to some decomposition product of these catalysts under the conditions existing. On the other hand the halogenated organic phosphite may tie up part of the tetravalent tin catalyst by salt formation or by chelating action to prevent this decomposition. It, also, may react with the polyurethane itself in such a fashion that it reunites urethane, ester or ether bonds as fast as they are broken. The halogenated organic phosphite may also be acting as a powerful antioxidant. In any event whatever may be the true explanation, it has been found that the use of these halogenated organic phosphites greatly retards the decomposition of polyurethane foams catalyzed by tetravalent tin compounds; particularly, it prevents the decomposition of flexible polyether foams during foaming and curing and even after extended heat aging so that the discoloration and tackiness obtained on curing or heat aging are not observed. Even when aromatic diisocyanates are used which normally give discolored products on heat aging, the degree of discoloration is greatly minimized.

The following examples will serve to illustrate the invention with more particularity to those skilled in the art.

EXAMPLE I 75 parts of Dow "112-3" triol, 1 part of dibutyl tin dilaurate, 0.2 part of a silicone block copolymer, 2.2 parts of water and 27.5 parts of an 80/20 mixture of 2,4- and 2,6-tolylene diisocyanates were introduced into the nozzle of a foaming machine where the ingredients were thoroughly mixed and the mixture was then dumped into a pan, all parts being by weight. After foaming and curing, the flexible closed cell foam product was tested as to density, percent rebound and 25% compression deflection. It was also heated in a laboratory oven at 110° C. for several days. Similar products were made in which 1.0 part and 0.5 part by weight of Thermolite 180, di-(nonyl phenyl) 2-chloro-propyl phosphite, was added to the same polyether-urethane reaction mixture and the same test procedures were followed. The results obtained on testing these flexible products are shown in Table I, below:

Table I

| Run No. | Polyether-Urethane Foam | Density, lbs./cu. ft. | Rebound, Percent | 25% Compression Deflection, lbs./10 sq. in. | Heat Aging in oven at 110° C. |
|---|---|---|---|---|---|
| 1 | Without chlorinated organic phosphite. | 2.5 | 40 | 8 | Entire foam discolored and tacky after 12 days. |
| 2 | With 1.0 part chlorinated organic phosphite. | 2.5 | 44 | 9 | Not discolored nor tacky after 52 days. |
| 3 | With 0.5 part chlorinated organic phosphite. | 2.3 | 46 | 7 | Do. |

These results show that while some of the initial physical properties are similar, there is an appreciable improvement in the percent rebound of the foams containing the chlorinated organic phosphite and an unexpectedly great increase in their resistance to heat degradation. It was unexpected to find that foams with the chlorinated organic phosphite showed no degradation after 52 days in contrast to the untreated foam which was degraded in only 12 days. These improvements are even more outstanding considering the relatively large amount of organo tin cataylsts employed. In this example Dow 112-3 is a propylene oxide adduct of glycerol capped with a little ethylene oxide during its manufacture, has 3 primary hydroxyl radicals and has a molecular weight of from about 2800 to 3100. The silicone has the general formula:

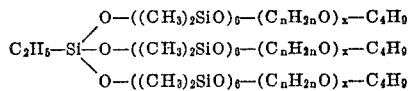

where $(C_nH_{2n}O)_x$ is a mixed polyoxyethylene-oxypropylene block containing about 17 oxytheylene and 13 oxypropylene units.

EXAMPLE II 75 parts of Carbide "LG-56" triol, 0.4 part of the silicone of Example I, above, 1 part of dibutyl tin dilaurate, 2.2 parts of water and 29.4 parts of an 80/20 mixture of 2,4- and 2,6-tolylene diisocyanates were pumped to the nozzle of a foaming machine, mixed, dumped and permitted to foam and cure essentially as shown in Example I, above, all parts being by weight. The resulting flexible closed cell foam was then tested in the manner shown in Example I and compared with a similar flexible foam containing additionally 1 part by weight of "Thermolite 180." The results obtained on the test are shown in Table II, below:

Table II

| Run No. | Polyether-Urethane Foam | Density, lbs./cu. ft. | Rebound, Percent | 25% Compression Deflection, lbs./10 sq. in. | Heat Aging in oven at 110° C. |
|---|---|---|---|---|---|
| 10 | Without chlorinated organic phosphite. | 2.5 | 37 | 10 | Entire foam discolored and tacky after 2 days. |
| 11 | With 1 part of chlorinated organic phosphite. | 2.5 | 46 | 11 | Not discolored nor tacky after 13 days. |

These results show that the chlorinated organic phosphite containing foam not only has improved physical properties but also has a great improvement in resistance to degradation. Carbide "LG-56" triol is a propylene oxide adduct of glycerol containing substantially 90 to 95% secondary hydroxyl radicals, an OH number of about 56, and an average molecular weight of from about 2800 to 3100.

Moreover, initial examinations were made of the flexible polyether urethane foams of Examples I and II, above, in that portions of the foams were cut open after curing but before heat aging. The centers or inner portions of the foams containing the chlorinated organic phosphite were not discolored nor tacky whereas the centers of the foams without said phosphite were discolored (brown) and tacky.

EXAMPLE III

The method of this example was similar to those of Examples I and II, above. The foam formulation was as follows:

Component: Parts by weight
LG-56 triol (see Example II) _____ 100
Silicone block copolymer (see Example I) ___ 0.85
Dibutyl tin-di-2-ethyl hexoate _____ 0.35
Dabco (cyclic triethylene diamine) _____ 0.10
N-methyl morpholine _____ 0.15
Water _____ 3.5
Tolylene diisocyanate (80/20 mixture of 2,4- and 2,6-isomers) _____ 46.5
Organic phosphite compound (as indicated below) _____ 0.4

With the exception of the tolylene diisocyanate, all of the above ingredients of the formulation were mixed together by means of an air stirrer in a one gallon container, and when these ingredients were uniformly mixed together, the tolylene diisocyanate was added, mixed in as rapidly and thoroughly as possible and the resulting mixture allowed to foam. After completion of the foaming operation, the foam was cooled to room temperature and, samples of each foam of the same size were placed in a circulating oven (dry air) at 140° C. and the condition of the foam checked at intervals of 1, 4, 7 and 16 hours. Samples of the foams aged for the indicated hours and which had not degraded too much were tested as to their set (90% compression set) and as to their tensile strength. In the 90% compression set test a sample of the aged foam cooled to room temperature is placed in a jig and compressed to 90% of its height, the jig and foam are then heated to 70° C. for about 22 hours, the foam is then removed from the jig and permitted to remain at room temperature for about ½ hour, the height of the foam is measured, and the loss in height is reported as the percent change in height as compared to the initial foam. The tensile strength is determined by stretching samples of the foam which have been previously aged for the indicated time at room temperature until they break and is given in pounds per square inch at break.

The following observations and properties were noted with respect to the foams obtained as shown in the table below:

foam or initially caused by the reversion reaction will accelerate the reversion reaction.

The accelerated aging tests are a measure of the expected performance of the foam under use; they are an accepted way of testing the polyurethane foam. The results shown in the table above clearly indicate the unexpected superiority of the foam having a chlorinated organic phosphite as compared to a foam containing an unchlorinated organic phosphite or a foam without any phosphite. For example, the foam without any phosphite degraded in one hour so that no physical properties could be measured. The foam with tris phenyl phosphite degraded after 7 hours, had a compression set of 18% and a tensile strength of 10.5 pounds after 4 hours; while the foam prepared from the corresponding chlorinated phosphite, i.e., tris (2,4,6-tri-chloro phenyl) phosphite, (a) exhibited only slight degradation after 16 hours (over twice as long as the time required for the degradation of the tris phenyl phosphite foam), (b) had

*Table III*

| Run No. | Phosphite | Hours in oven at 140° C. | | | | Physical Properties |
|---|---|---|---|---|---|---|
| | | 1 | 4 | 7 | 16 | |
| 20 | None | (1) | | | | No physical properties were obtainable on degraded sample. |
| 21 | Tris phenyl phosphite | OK | OK | (1) | | 90% compression set after 4 hrs.: 18%. Tensile strength after 4 hrs.: 10.5 p.s.i. |
| 22 | Tris-(2,4,6-trichlorophenyl) phosphite. | OK | OK | OK | (2) | 90% set after 7 hrs.: 8.0%; after 16 hrs.: 25.0%. Tensile strength after 7 hrs.: 15.1 p.s.i.; after 16 hrs.: 8.7 p.s.i. |
| 23 | Tris-ethyl phosphite | OK | (2) | (3) | | 90% set after 4 hrs.: 28.2%; after 7 hrs.: 100%. Tensile strength after 4 hrs.: 6.0 p.s.i.; after 7 hrs.: 0.5 p.s.i. |
| 24 | Tris (2-chlorethyl) phosphite | OK | OK | OK | (2) | 90% set after 7 hrs.: 15.7%; after 16 hrs.: 39.0%. Tensile strength after 7 hrs.: 12.9 p.s.i.; after 16 hrs.: 6.2 p.s.i. |
| 25 | Tris (p-ethylphenyl) phosphite. | OK | OK | (1) | | 90% set after 4 hrs.: 20.1%. Tensile strength after 4 hrs.: 8.5 p.s.i. |
| 26 | Tris-(p-β-chloroethyl phenyl) phenyl) phosphite. | OK | OK | OK | (2) | 90% set after 7 hrs.: 10.3%; after 16 hrs.: 28.7%. Tensile strength after 7 hrs.: 14.1 p.s.i.; and after 16 hrs.: 8.5 p.s.i. |

1 Degraded.
2 Slight degradation.
3 Shows definite signs of being degraded.

In Table III above, the term "OK" means that when a sample of the aged foam was cut open, the center of the foam was strong and had not crumbled; the term "degraded" means that when a sample of the aged foam was cut open, the center had crumbled or was in the form of crumbles; the phrase "slight degradation" means that when a sample of the aged foam was cut open, the center was weak and showed a few crumbles; and the phrase "shows definite signs of being degraded" means that when a sample of the aged foam was cut open, the center was weak and showed many crumbles.

It will be noted that the surface of some aged polyurethane foams may not appear degraded but that when the foam is cut open the interior of a degraded foam is crumbly or contains crumbles or fine particles and may be discolored or the center may be so weak one can easily push a finger or pencil through it. Moreover, the degraded foam exhibits poor tensile strength and high compression set. The reason the surface of the aged foam may appear satisfactory may be that oxygen in the air adjacent the outer surface inhibits the action of the tin catalyst whereas air circulation in the interior of the foam is much less and consequently any effect due to oxygen is negligible. Since the foam is also an insulator, any heat transfer from the center of the foam to the surface will be slow, and thus any heat trapped in the center of the a compression set after 7 hours of 8% as compared to a compression set of 18% after 4 hours for the non-chlorinated phosphite (less than half as much set with a 75% increase in time for the chlorinated phosphite as compared to the unchlorinated phosphite), and (c) had a tensile strength after 7 hours of 15.1 pounds as compared to a tensile of 10.5 pounds after 4 hours for the non-chlorinated phosphite.

Table III, above, also shows similar new and unexpected results when using in foams tris (2-chloroethyl) phosphite and tris (p-β-chloroethyl phenyl) phosphite as compared to the corresponding unchlorinated materials, i.e., tris ethyl phosphite and tris (p-ethyl phenyl) phosphite. It is not known why the chlorinated phosphites should be so much more effective than the unchlorinated phosphites when the polyurethane foam is subjected to aging conditions especially when it is considered that the amount of phosphite and consequently chlorine attached thereto is relatively very small.

The same types of phosphites have also been evaluated in other polyurethane foam systems where, in place of dibutyl tin-di-2-ethyl hexoate, dibutyl tin dilaurate and dibutyl tin diacetate were employed with the achievement of similar results on aging, although no physical tests (compression set and tensile strength) were run since they were not deemed necessary.

EXAMPLE IV

The method of this example was similar to those of Examples I to III, above. The foam formulation employed was as follows:

| Component: | Parts by weight |
|---|---|
| "LG-56" triol (see Example II) | 100 |
| 80-20 mixture of 2,4- and 2,6-tolylene diisocyanates | 45 |
| Water | 3.5 |
| Silicone block polymer (see Example I) | 0.7 |
| Dabco (see Example III) | 0.1 |
| N-methyl morpholine | 0.15 |
| Dibutyl tin dilaurate | 0.25 |
| Organic phosphite compound | 1.5 |

The above ingredients of the foam were essentially mixed together and poured into a mold in a "one-shot" process to produce a polyurethane foam. Specimens of the various foams after curing were cut from the foams and tested in accordance with ASTM Designation D-1564-58T, "Tentative Specifications and Methods of Test for Flexible Urethane Foam" issued in 1958. The tests were conducted on test specimens of a size of about 4" x 4" x 1". The load deflection tests followed the "Load Deflection Tests, Method A Indentation" on page 1727 of said ASTM specification. The load deflection of a sample of the original foam was measured; this sample was then placed in a steam autoclave having a temperature of above about 212° F. (see "Steam Autoclave Test" on pages 1725-26 of said ASTM Specification"); the sample was then aged in steam in said autoclave for 6 hours; and the aged sample was removed from the autoclave, dried in an oven for about 2 hours, allowed to come to equilibrium over night at room temperature and then tested again for 25% load deflection (25% of original height). The values reported represent the change in load deflection as compared to the original sample after the indicated hours under steam aging. This difference represents the percent change (+ percent if higher and − percent if lower) of recovery as compared to the original sample. Also, the same foam sample was similarly treated and tested after another 3 hours (total—9 hours) steam aging and after still another 3 hours (total—12 hours). The results for the 6, 9 and 12 hours steam aging runs and the 25% change in deflections obtained are shown below in Table IV:

*Table IV*

| Run No. | Type of Organic Phosphite Compound | Density, lbs. per Cubic Foot | Stereoclave (steam) Aging Time, Hours | Percent Change In 25% Deflection After Stereoclave Aging |
|---|---|---|---|---|
| 30 | Thermolite 180 | 2.05 | 6 | +4.0 |
|    |                |      | 9 | +2.0 |
|    |                |      | 12 | +2.0 |
| 31 | Tris (alpha chloroethyl) phosphite. | 2.24 | 6 | −11.6 |
|    |                |      | 9 | −15.5 |
|    |                |      | 12 | −19.6 |
| 32 | Tris(nonyl phenyl) Phosphite, "Polygard". | 2.16 | 6 | −20.6 |
|    |                |      | 9 | −24.0 |
|    |                |      | 12 | −30.0 |
| 33 | Tris-isooctyl phosphite. | 2.10 | 6 | −19.0 |
|    |                |      | 9 | −20.7 |
|    |                |      | 12 | −24.1 |

The above data clearly show the unexpected improvement realized in the 25% deflection properties when using a halogenated organic phosphite to stabilize the polyurethane foams as compared to using a non-halogenated organic phosphite.

Furthermore, foams of the present invention containing the halogenated organic phosphites to not deteriorate in the presence of small amounts of carboxylic acids, body acids or fluids and the like in contrast to the deterioration obtained with foams made without halogenated organic phosphites. Thus, the foams of the present invention are particularly useful in the manufacture of mattresses and similar articles.

It is to be understood that in accordance with the provisions of the patent statutes, the particular form of product shown and described and the particular procedure set forth are presented for purposes of explanation and illustration and that various modifications of said product and procedure can be made without departing from my invention.

Having thus described my invention, what I claim is:

1. A cellular organic polyurethane having a minor amount by weight of an organic tetravalent tin salt catalyst and also containing a minor amount by weight sufficient to prevent heat degradation of said polyurethane by said catalyst of an organic phosphite selected from the group consisting of fluorine and chlorine containing monomeric triorganic phosphites and mixtures thereof.

2. A cellular organic polyurethane having a minor amount by weight of an organic tetravalent tin salt catalyst having at least one direct carbon to tin bond and also containing a minor amount by weight sufficient to prevent heat degradation of said polyurethane by said catalyst of a monomeric triorganic phosphite in which each organic radical is a monovalent hydrocarbon radical free of aliphatic unsaturation, at least one of said radicals having attached to a carbon atom at least one halogen atom having an atomic weight less than 40, and the total maximum number of said halogen atoms present in said phosphite being equal to the maximum possible number of carbon-hydrogen linkages in said radicals.

3. A cellular organic polyurethane according to claim 2 in which each organic radical contains from 6 to 14 carbon atoms and from 1 to 2 of said halogen atoms.

4. A cellular organic polyurethane selected from the group consisting of polyester-urethanes, polyether-urethanes and mixtures thereof, having a minor amount by weight of an organic tetravalent tin salt catalyst having at least one direct carbon to tin bond and also containing a minor amount by weight sufficient to prevent head degradation of said polyurethane by said catalyst of a monomeric triorganic phosphite in which at least one organic radical has attached to a carbon atom at least one halogen atom having an atomic weight less than 40, the total maximum number of said halogen atoms present in said phosphite being equal to the maximum possible number of carbon-hydrogen linkages in said organic radicals.

5. A flexible cellular organic polyether-urethane having a minor amount by weight of an organic tetravalent tin salt catalyst having at least one direct carbon to tin bond and also containing from about 0.05 to 7.5% by weight based on the polyether-urethane in said cellular material to prevent heat degradation of said polyether-urethane by said catalyst of a halogenated organic phosphite having the general formula:

where R is selected from the group consisting of alkyl, aralkyl, aryl, alkaryl, and cycloaliphatic radicals, at least one of said radicals having from 1 to 2 chlorine atoms and from 6 to 14 carbon atoms.

6. A flexible cellular organic polyether-urethane according to claim 5 in which R is a monochloro alkyl-aryl radical.

7. A flexible cellular organic polyether-urethane according to claim 5 in which R is a monochloro aryl radical.

8. A flexible cellular organic polyether-urethane according to claim 5 in which R is a monochloro alkyl radical.

9. A flexible organic polyether-urethane foam having a minor amount by weight of an organic tetravalent tin salt catalyst and also containing from about 0.1 to 3.0% by weight based on the weight of the polyether-urethane in said foam of a mixture of monomeric tri(monochloro-alkyl) and tri(monochloro-aryl) phosphites, said alkyl and aryl radicals of said phosphites having not more than 14 carbon atoms, to prevent heat degradation of said polyether urethane foam by said catalyst.

10. A flexible organic polyether-urethane foam containing a minor amount by weight of a silicone and an organic tetravalent tin salt catalyst and from about 0.1 to 3.0% by weight based on the weight of the polyether-urethane in said foam of a mixture of monomeric tri (monochloro-alkyl) and tri (monochloro-aryl) phosphites, said alkyl and aryl radicals of said phosphites having not more than 14 carbon atoms, to prevent heat degradation of said polyether-urethane foam by said catalyst.

11. The method which comprises reacting in amounts sufficient to form a cellular polyurethane an organic polyisocyanate with a polymer selected from the group consisting of polyesters, alkylene polyethers and mixtures thereof, and containing active hydroxyl groups, in admixture with a blowing agent, and in the presence of a minor amount by weight of an organic tetravalent tin salt catalyst and a minor amount by weight sufficient to prevent heat degradation of said polyurethane by said catalyst of a monomeric triorganic phosphite in which at least one organic radical has attached to a carbon atom at least one halogen atom having an atomic weight less than 40, the total maximum number of said halogen atoms present in said phosphite being equal to the maximum possible number of carbon-hydrogen linkages in said organic radicals.

12. The method which comprises reacting in amounts sufficient to form a cellular polyurethane an organic polyisocyanate with a polymer containing active hydroxyl groups and comprising an alkylene polyether, in admixture with a blowing agent, and in the presence of a minor amount by weight of an organic tetravalent tin salt catalyst having at least one direct carbon to tin bond and a minor amount by weight sufficient to prevent heat degradation of said polyurethane by said catalyst of a monomeric triorganic phosphite in which each organic radical is a monovalent hydrocarbon radical free of aliphatic unsaturation, at least one of said radicals having attached to a carbon atom at least one halogen atom having an atomic weight less than 40 and the total maximum number of said halogen atoms present in said phosphite being equal to the maximum possible number of carbon-hydrogen linkages in said radicals.

13. The method according to claim 12 in which each organic radical contains from 6 to 14 carbon atoms and from 1 to 2 of said halogen atoms.

14. The method of making a cellular, flexible polyether-urethane which comprises reacting an aromatic diisocyanate with a branch chain polyether polyol having at least 3 reactive hydroxyl groups and an average molecular weight from about 2000 to 4000 in the presence of a blowing agent and an organic tetravalent tin salt catalyst and in amounts sufficient to crosslink and chain extend said reactants and to form a foamed network and in the further presence of from about 0.05 to 7.5% by weight based on the weight of said polyurethane forming materials of a halogenated organic phosphite to prevent heat degradation of said polyether-urethane by said catalyst and having the general formula:

where R is selected from the group consisting of alkyl, aryl, alkaryl, aralkyl and cycloaliphatic groups, at least one of said groups having from 1 to 2 chlorine atoms and from 6 to 14 carbon atoms.

15. The method according to claim 14 in which R is a monochloro aryl radical.

16. The method according to claim 14 in which R is a monochloro alkyl radical.

17. The method according to claim 14 in which R is a monochloro alkyl-aryl-radical.

18. The method according to claim 14 in which said halogenated organic phosphite is a mixture of monomeric tri (monochloro alkyl) and tri (monochloro aryl) phosphites and is used in an amount of from about 0.1 to 3.0% by weight based on the weight of the polyether-urethane forming materials and in which said reaction mixture contains additionally a minor amount of a silicone, said alkyl and aryl radicals of said phosphite having not more than 14 carbon atoms.

References Cited by the Examiner

UNITED STATES PATENTS

| 2,806,831 | 9/57 | Beindorff | 260—45.7 |
| 2,866,774 | 12/58 | Price | 260—2.5 |
| 2,915,496 | 12/59 | Swart et al. | 260—2.5 |
| 2,938,877 | 5/60 | Mack et al. | 260—45.75 |

LEON J. BERCOVITZ, *Primary Examiner.*

DONALD E. CZAJA, *Examiner.*